2,983,730
Patented May 9, 1961

2,983,730
SUBSTITUTED 2,1,3 - BENZOTHIADIAZOLE - SULFONAMIDES HAVING DIURETIC PROPERTIES

Edward J. Cragoe, Jr., Lansdale, Pa., assignor to Merck & Co., Inc., Rahway, N.J., a corporation of New Jersey No Drawing. Filed Apr. 6, 1959, Ser. No. 804,117

10 Claims. (Cl. 260—304)

This invention relates to novel substituted 2,1,3-benzothiadiazolesulfonamides and alkali metal salts thereof, which have the structural formula

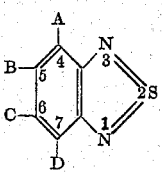

where A and D are selected from the group consisting of hydrogen, amino and sulfamyl, B is selected from the group consisting of hydrogen, sulfamyl and chlorine and C is selected from the group consisting of hydrogen and chlorine, such compound having at least one sulfamyl group and said group being located in the 4-, 5-, or 7- position on the ring, said compound having diuretic properties.

The new compounds in accordance with this invention are useful chemotherapeutic agents particularly because of their diuretic properties. The compounds can be administered in therapeutic dosages in conventional vehicles as in the form of tablets, since they are effective when administered orally as well as when injected. Since the alkali metal salts of the compounds of this invention are also readily soluble in an isotonic aqueous medium, injectable solutions can be prepared by dissolving the compound in the selected medium. The alkali metal salts are stable of themselves, although preservatives may be added if desired.

The dosage of the substituted 2,1,3-benzothiadiazolesulfonamides may be varied over a wide range and for this reason, scored tablets containing 100, 150, 250, and 500 milligrams of the active ingredient may be made available to the physician for the symptomatic adjustment of the dosage to the individual patient. These dosages are well below the toxic or lethal dose of the compounds.

Substituted 2,1,3-benzothiadiazolesulfonamides in accordance with this invention are readily prepared by reacting a 2,1,3-benzothiadiazole with chlorosulfonic acid and treating the product with ammonia. In some cases it is desirable, after the chlorosulfonic reaction, to add thionyl chloride, after which the product is treated with ammonia. In other cases, it is desirable to prepare a substituted 2,1,3-benzothiadiazolesulfonamide by preparing the corresponding diaminobenzene sulfonamide, and reacting it with N-sulfinylaniline, thereby coverting the adjacent amino groups into the benzothiadiazole linkage.

Wide varieties of compounds in accordance with this invention may be prepared utilizing the foregoing procedures. Among typical compounds which have been proven highly useful and advantageous because of their diuretic properties are the following:

2,1,3-benzothiadiazole-4-sulfonamide
2,1,3-benzothiadiazole-5-sulfonamide
5,6-dichloro-2,1,3-benzothiadiazole-4-sulfonamide
6-chloro-2,1,3-benzothiadiazole-5-sulfonamide
5-chloro-2,1,3-benzothiadiazole-4 (or 7)-sulfonamide
4-amino-2,1,3-benzothiadiazole-5,7-disulfonamide The alkali metal salts of the compounds of this invention are prepared with convenience by dissolving the compound in an aqueous or alcoholic solution of the selected alkali metal hydroxide and, if desired, isolating the salt by evaporating the solvent. Any of the conventional alkali metal salts, such as sodium, potassium, lithium or the like salts, can be prepared by this method or by any other methods conventionally used and well known to skilled organic chemists.

The preparation of these compounds is more fully described in the following examples. It is to be understood, however, that the examples are illustrative of the methods employed for their preparation and are not to be construed as limiting the invention to the particular reaction conditions specifically described.

EXAMPLE 1

2,1,3-BENZOTHIADIAZOLE-4-SULFONAMIDE

Step 1.—Preparation of 2,1,3-Benzothiadiazole-4-sulfonyl chloride

A one-liter, 4-necked flask was fitted with a mechanical stirrer, thermometer, dropping funnel and reflux condenser protected with a calcium chloride drying tube. Chlorosulfonic acid (522 g., 4.5 mole, 300 ml.) was placed in the flask and warm, freshly melted 2,1,3-benzothiadiazole (122.9 g., 0.9 mole) placed in the dropping funnel. The reaction vessel was chilled using an ice bath and the stirrer started. The 2,1,3-benzothiadiazole was added dropwise over a period of 20 minutes, keeping the temperature below 20° C.

The ice bath was replaced by an electric heating mantle and the stirring solution was heated at 140° C. for 4 hours. During this time a considerable evolution of gas was observed. The mixture was cooled to 20° C. and thionyl chloride (216 g., 1.8 mole, 135 ml.) was added via the dropping funnel over a period of 10 minutes.

The stirring mixture was refluxed for an hour and then cooled and cautiously poured with stirring into crushed ice (1500 g.). The fine white solid that separated was filtered and thoroughly washed with cold water. After sucking as dry as possible on the suction filter, the product was dried in a vacuum desiccator. The yield was 200 g. (95%), M.P. 142.5–145.5° C. Recrystallization from a mixture of cyclohexane and a little benzene gave 188 g. (90%), M.P. 149.5–150.5° C.

An analysis of the product showed that it corresponded closely to the empirical formula $C_6H_3ClN_2O_2S_2$, confirming that the compound was 2,1,3-benzothiadiazole-4-sulfonyl chloride.

Step 2.—Preparation of 2,1,3-benzothiadiazole-4-sulfonamide

In a three necked 500 ml. round bottomed flask equipped with a mechanical stirrer and reflux condenser was placed 2,1,3-benzothiadiazole-4-sulfonyl chloride (25 g., 0.107 mole) and concentrated aqueous ammonia (30% $NH_3$) (200 ml.). The mixture was stirred and gently heated on a steam bath for 30 minutes and then another addition of concentrated aqueous ammonia (50 ml.) was made. After another 30 minutes a second addition of concentrated aqueous ammonia (50 ml.) was made. The steam bath was replaced with an electric heating mantle and the mixture refluxed for an hour.

The condenser was removed to allow part of the ammonia and water to distill off. After about 15 minutes the solution was seeded and cooled. The crystalline product was removed by filtration and washed with a little cold water. The yield was 22.2 g. (97%),

M.P.=133–134° C.

Recrystallization from water gave 18.5 g. (83%), 133.5–134.5° C.

An analysis of the product showed that it conformed closely to the empirical formula $C_6H_5N_3O_2S$, confirming the fact that the product was 2,1,3-benzothiadiazole-4-sulfonamide.

EXAMPLE 2

2,1,3-BENZOTHIADIAZOLE-5-SULFONAMIDE

A one liter, 4-necked round bottomed flask was fitted with a mechanical stirrer, thermometer, gas-inlet tube and reflux condenser fitted with a calcium chloride drying tube. Dry xylene (300 ml.), N-sulfinylaniline (31.3 g., 0.225 mole) and 3,4-diaminobenzenesulfonamide (19.6 g., 0.105 mole) were placed in the reaction flask. The air in the flask was replaced by dry nitrogen. The stirrer was started and mixture heated via an electric heating mantle.

After gradually heating to 135–140° C. the mixture was refluxed for 2 hours. The hot solution was decanted into a beaker and the reaction vessel rinsed with 50 ml. of boiling xylene. The combined solutions were cooled and the yellow crystals that separated were filtered off and dried. The yield was 21 g. (93%), M.P. 157–159° C. Two recrystallizations from water gave an excellent recovery of material melting at 159–160° C.

An analysis of the product showed that it corresponded closely to the empirical formula $C_6H_5N_3O_2S_2$, confirming that the compound was 2,1,3-benzothiadiazole-5-sulfonamide.

EXAMPLE 3

5,6-DICHLORO-2,1,3-BENZOTHIADIAZOLE-4-SULFONAMIDE

*Step 1.—Preparation of 5,6-dichloro-2,1,3-benzothiadiazole-4-sulfonyl chloride*

In a 250 ml. 3-necked flask fitted with a mechanical stirrer, thermometer, and reflux condenser protected with a tube of calcium chloride was placed chlorosulfonic acid (100 ml., 176.6 g., 1.5 mole). The stirrer was started and 5,6-dichloro-2,1,3-benzothiadiazole (22.7 g., 0.111 mole) was added portionwise over 15 minutes, keeping the temperature below 10° C. by means of an ice bath.

The mixture was refluxed for 150 hours using an electric heating mantle. The solution was cooled to 10° C. and treated with thionyl chloride (18.3 ml., 30.4 g., 0.26 mole). After refluxing for an additional hour the solution was cooled and poured, with stirring, into 600 g. of crushed ice. The tan-colored solid that resulted was separated by filtration, washed with cold water and dried in a vacuum desiccator over concentrated sulfuric acid. The yield was 29.3 g. (87%). Recrystallization from cyclohexane gave 22.0 g., M.P. 115–116.5° C. Two more recrystallizations gave material melting at 118–119° C.

An analysis of the product showed that it corresponded closely to the empirical formula $C_6HCl_3N_2O_2S_2$, confirming that the compound was 5,6-dichloro-2,1,3-benzothiadiazole-4-sulfonyl chloride.

*Step 2.—Preparation of 5,6-dichloro-2,1,3-benzothiadiazole-4-sulfonamide*

5,6-dichloro-2,1,3-benzothiadiazole-4-sulfonyl chloride (18.8 g., 0.0619 mole) was placed in a 500 ml. Erlenmeyer flask and dissolved in dry benzene (180 ml.). A stream of dry ammonia was passed through the solution for an hour. The solid that separated was removed by filtration, washed with a little benzene and dried.

The product was suspended in water, filtered, washed with water and dried. The yield was 16.7 g. (95%). Recrystallization from a mixture of dimethylformamide and n-butyl alcohol gave 10.8 g., M.P. 331–334° C. Further recrystallization gave material melting at 337.5–338.5.

An analysis of the product showed that it corresponded closely to the empirical formula $C_6H_3Cl_2N_3O_2S_2$, confirming that the compound was 5,6-dichloro-2,1,3-benzothiadiazole-4-sulfonamide.

EXAMPLE 4

6-CHLORO-2,1,3-BENZOTHIADIAZOLE-5-SULFONAMIDE

*Step 1.—Preparation of 2-chloro-4-amino-5-nitrobenzenesulfonamide*

A 100 ml., 3-necked flask was fitted with a mechanical stirrer, thermometer and air condenser protected with a calcium chloride tube. The flask was charged with chlorosulfonic acid (50 ml., 88.5 g., 0.76 mole) and cooled to 10° C. in an ice bath. The stirrer was started and 2-nitro-5-chloroaniline (17.2 g., 0.1 mole) added portionwise with good stirring. The cooling bath was replaced with a steam bath and the mixture gradually heated to 97–98° C. After stirring at this temperature for 45 minutes the mixture was cooled to 10° C. and carefully stirred into 300 g. of crushed ice. The yellow-brown 2-chloro-4-amino-5-nitrobenzenesulfonyl chloride was removed by filtration, and washed with a little ice water.

A 300 ml. round bottomed flask fitted with a mechanical stirrer and reflux condenser was charged with concentrated aqueous ammonia (30% $NH_3$)(75 ml.). The solution was cooled to 10° C. and the moist 2-chloro-4-amino-5-nitrobenzenesulfonyl chloride added with stirring. The cooling bath was removed and the suspension was stirred at room temperature for 2 hours. Another 25 ml. of concentrated aqueous ammonia was added and the suspension heated in a steam bath for 1 hour. A second addition of 25 ml. of aqueous ammonia was made and stirring and heating continued for another hour. The mixture was cooled and the product separated by filtration, washed with ice water and dried in a vacuum desiccator over concentrated sulfuric acid.

The yield was 17.6 g. (70%). Recrystallization, twice from a mixture of 2-methoxyethanol and water and once from 1-propanol, gave material melting at 256–257° C.

An analysis of the product showed that it corresponded closely to the empirical formula $C_6H_6ClN_3O_4S$, confirming that the compound was 2-chloro-4-amino-5-nitrobenzenesulfonamide.

*Step 2.—Preparation of 2-chloro-4,5-diaminobenzene sulfonamide*

2-chloro-4-amino-5-nitrobenzenesulfonamide (7.52 g., 0.03 mole) was dissolved and suspended in absolute methanol (300 ml.) and placed in a Pyrex glass bottle. 5% palladium on charcoal catalyst (2 g.) was added and hydrogenation carried out using Parr hydrogenation apparatus. A hydrogen pressure of about 45 lb. per square inch and room temperature were employed. The theoretical quantity of hydrogen was consumed during a 5½-hour period after which the catalyst was removed by filtration.

Two more runs of the same size were carried out and the combined methanol solutions were concentrated at reduced pressure. The solid that separated during the concentration process was removed at intervals until only about 25 ml. of methanol solution remained (which was discarded). The yield of tan-colored solid was 17.5 g. (88%). Recrystallization from water gave 14.8 g., M.P. 217.5–218.5° C. Further recrystallization gave nearly white material melting at 223–223.5° C.

An analysis of the product showed that it corresponded closely to the empirical formula $C_6H_8ClN_3O_2S$, confirming that the compound was 2-chloro-4,5-diaminobenzenesulfonamide.

*Step 3.—Preparation of 6-chloro-2,1,3-benzothiadiazole-5-sulfonamide*

A 250 ml., 4-necked round bottomed flask was fitted with mechanical stirrer, gas inlet tube, thermometer and reflux condenser protected with a calcium chloride tube. The flask was charged with 2-chloro-4, 5-diamino-benzenesulfonamide (5.5 g., 0.0248 mole), N-sulfinylaniline (7.36 g., 0.0530 mole) and dry xylene (120 ml.). The system was flushed with dry nitrogen and then maintained with a very slow flow throughout the reaction period.

The stirrer was started and the flask heated via an electric heating mantle. After refluxing for 23 hours the mixture was filtered while hot to separate the insoluble unreacted starting material (1.67 g.). Cooling the filtrate gave 3.94 g. (92% based on the used starting material). Recrystallization from water gave 3.35 g., M.P. 180–181° C.

An analysis of the product showed that it corresponded closely to the empirical formula $C_6H_4ClN_3O_2S_2$, confirming that the compound was 6-chloro-2,1,3-benzothiadiazole-5-sulfonamide.

EXAMPLE 5

5-Chloro-2,1,3-Benzothiadiazole-4(or 7)-Sulfonamide

*Step 1.—Preparation of 5-chloro-2,1,3-benzothiazole-4 (or 7)-sulfonyl chloride*

A 200 ml., 3-necked flask, equipped with a mechanical stirrer, thermometer and air condenser protected with a calcium chloride tube, was charged with chlorosulfonic acid (132.8 g., 1.4 moles, 75 ml.). The stirrer was started and the liquid cooled to 10° C. via an ice bath and 5-chloro-2,1,3-benzothiadiazole (25.59 g., 0.15 mole) added portionwise over 10 minutes.

The cooling bath was removed and replaced with an electric heating mantle and the mixture heated at 150–152° C. for 15 hours. The solution was cooled to 10° C. and treated with thionyl chloride (21.5 ml., 35.6 g., 0.3 mole) then stirred and refluxed for 1 hour. The reaction mixture was cooled to 5° C. and cautiously stirred into 400 g. of crushed ice.

The solid product was removed by filtration, washed with ice water and dried in a vacuum desiccator over concentrated sulfuric acid. The yield was 39.8 g. (99%). Recrystallization from a mixture of cyclohexane and benzene gave 28.4 g., M.P. 130–132.5° C. Recrystallization from methylcyclohexane gave material melting at 132–133° C.

An analysis of the product showed that it corresponded closely to the empirical formula $C_6H_2Cl_2N_2O_2S_2$, confirming that the compound was 5-chloro-2,1,3-benzothiadiazole-4 (or 7)-sulfonyl chloride.

*Step 2.—Preparation of 5-chloro-2,1,3-benzothiazole-4 (or 7)-sulfonamide*

In a 500 ml., 3-necked flask equipped with a mechanical stirrer and reflux condenser was placed finely pulverized 5-chloro-2,1,3-benzothiadiazole-4 (or 7)-sulfonyl chloride and concentrated aqueous ammonia (30% $NH_3$) (250 ml.). The solid formed a cake which was broken up and the mixture stirred and heated on a steam bath. Additional quantities (25 ml. portions) of concentrated aqueous ammonia were added at 30 minute intervals until five additions had been made. After heating for another 30 minutes the solid had completely dissolved.

The solution was transferred to an Erlenmeyer flask and boiled for a few minutes on a hot plate. After treating with a little decolorizing carbon, the solution was filtered hot, concentrated to a volume of 250 ml. and cooled. The crystalline product was filtered off and dried. The yield was 15.3 g. (82%). Recrystallization from water gave 10.7 g., M.P. 146–149° C. Further recrystallization from water, then from toluene gave material melting at 149–152° C.

An analysis of the product showed that it corresponded closely to the empirical formula $C_6H_4ClN_3O_2S_2$, confirming that the compound was 5-chloro-2,1,5-benzothiadiazole-4 (or 7)-sulfonamide.

EXAMPLE 6

4-Amino-2,1,3-Benzothiadiazole-5,7-Disulfonamide

*Step 1.—Preparation of 4-amino-2,1,3-benzothiadiazole-5,7-disulfonyl chloride*

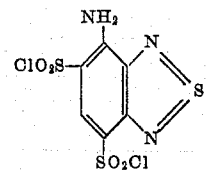

In a 250 ml. round bottomed flask equipped with a mechanical stirrer, thermometer and reflux condenser whose open end was capped with a calcium chloride drying tube, was placed chlorosulfonic acid (87 ml., 154 g., 1.32 moles). The stirrer was started and the chlorosulfonic acid cooled to 10° C. and 4-amino-2,1,3-benzothiadiazole (9.21 g., 0.0609 mole) added portionwise, over a period of 50 minutes, keeping the temperature at 10–15° C.

The reaction vessel was closed and heated via an electric heating mantle. The temperature was slowly raised to 125° C. over a period of one hour. It was then slowly heated from 125° C. to 135° C. over a period of two hours. After gradually raising the temperature from 135° to 140° C. over the next half hour, it was finally heated at 140°–145° C. for an hour.

The mixture was cooled and treated with thionyl chloride (18.7 ml., 31 g., 0.26 mole) and then gradually heated to 130° C. over a period of two hours. The mixture was again cooled and then poured with stirring into crushed ice (1 kg.) which was cooled in a Dry Ice-2-ethoxyethanol bath.

The orange product that separated was removed by filtering, washed with water and dried. The yield was 19.4 g. (92%). Recrystallization from benzene gave yellow needles, M.P. 148–149.5° C. (corr.).

An analysis of the product showed that it conformed closely to the empirical formula $C_6H_3Cl_2N_3O_4S_3$, confirming the fact that the product was 4-amino-2,1,3-benzothiadiazole-5,7-disulfonyl chloride.

*Step 2.—Preparation of 4-amino-2,1,3-benzothiadiazole-5,7-disulfonamide*

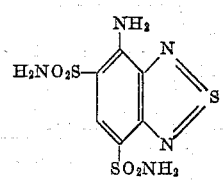

Liquid ammonia (31.0 g., 1.82 mole) was placed in a beaker cooled by a Dry Ice-2-ethoxyethanol bath. 4-amino-2,1,3-benzothiadiazole-5,7-disulfonyl chloride (10 g., 0.029 mole) was added to the liquid ammonia solution with stirring. The solid readily dissolved producing an orange solution.

The liquid ammonia solution was removed from the cooling bath and the ammonia allowed to evaporate. The solid residue was suspended in 100 ml. of water and dissolved by the addition of 2N sodium hydroxide solution. The orange solution was filtered and the filtrate acidified by stirring and adding 2N hydrochloric acid dropwise.

The light yellow solid was separated by filtration, washed with water and dried. The yield was 8.7 g. (97%). Recrystallization from water or a mixture of water and ethanol gave material melting at 273–274° C. (corr.).

An analysis of the product showed that it conformed closely to the empirical formula ($C_6H_7N_5O_4S_3$), confirming the fact that the product was 4-amino-2,1,3-benzothiadiazole-5,7-disulfonamide.

EXAMPLE 7

Compressed table containing 250 milligrams of active ingredient per tablet, in a quantity suitable for fifty tablets:

| | Grams |
|---|---|
| 2,1,3-benzothiadiazole-4-sulfonamide | 12.500 |
| Calcium phosphate tribasic | 2.095 |
| Methylcellulose 15 cps. 2%, 3 cc. | 0.060 |
| Starch paste 10%, 1 part; gelatine solution 20%, 1 part, 3 cc. | 0.450 |
| | 15.105 |
| Methylcellulose 15 cps. | 0.750 |
| Talc, dried | 0.750 |
| | 16.605 |

2,1,3-benzothiadiazole - 4 - sulfonamide and calcium phosphate tribasic are mixed together and then passed twice through No. 60 bolting cloth. The methylcellulose solution is then added and thoroughly mixed in the granulation and the mixture then passed through a No. 10 screen. The starch-gelatine solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a 13/32" standard curvature punch yielding 50 tablets having a thickness of 0.155 to 0.160 inch, ten of which weigh 3.321 grams. The tablets have a hardness of 5 to 6 kilograms measured by the Monsanto Chemical Company tablet hardness tester apparatus, and a disintegration time of 12 minutes when tested by the U.S.P. tablet distingrating apparatus (U.S. Pharmacopoeia, 15th edition, p. 937).

Similarly, the other products heretofore disclosed may be formed into tablets using the formula set forth above.

EXAMPLE 8

The following is a suitable mixture, showing appropriate quantities per tablet:

| | Mgm. |
|---|---|
| 2,1,3-benzothiadiazole-5-sulfonamide | 250 |
| Calcium phosphate tribasic | 40 |
| Starch (as 12.5% starch paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted and compressed into tablets in substantially the same manner described in Example 7.

EXAMPLE 9

The following is a suitable mixture, showing appropriate quantities per tablet:

| | Mgm. |
|---|---|
| 5,6-dichloro-2,1,3-benzothiadiazole-4-sulfonamide | 250 |
| Calcium phosphate tribasic | 40 |
| Starch (as 12.5% starch paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted and compressed into tablets in substantially the same manner described in Example 7.

EXAMPLE 10

The following is a suitable mixture, showing appropriate quantities per tablet:

| | Mgm. |
|---|---|
| 6-chloro-2,1,3-benzothiadiazole-5-sulfonamide | 250 |
| Calcium phosphate tribasic | 40 |
| Starch (as 12.5% starch paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted and compressed into tablets in substantially the same manner described in Example 7.

EXAMPLE 11

The following is a suitable mixture, showing appropriate quantities per tablet:

| | Mgm. |
|---|---|
| 4-amino-2,1,3-benzothiadiazole-5,7-disulfonamide | 250 |
| Calcium phosphate tribasic | 40 |
| Starch (as 12.5% starch paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted and compressed into tablets in substantially the same manner described in Example 7.

Activity tests of the foregoing compounds revealed them to be active at small fractions of the full dose, intravenously, as indicated by the following table. The full dose is conventionally and arbitrarily set at an initial priming dose of 25 milligrams per kilogram of body weight followed by an infusion of 30 mg./kg./hr., and the figures presented in the following table represent fractions of that dosage. The activity tests were run in dogs.

| Compound: | Intravenous dosage (I.V.) |
|---|---|
| 2,1,3-benzothiadiazole-4-sulfonamide | 1/20 |
| 2,1,3-benzothiadiazole-5-sulfonamide | 1/10 |
| 5,6-dichloro-2,1,3-benzothiadiazole-4-sulfonamide | 1/10 |
| 6-chloro-2,1,3-benzothiadiazole-5-sulfonamide | 1/20 |
| 5-chloro-2,1,3-benzothiadiazole-4-(or 7)-sulfonamide | 1/20 |
| 4-amino-2,1,3-benzothiadiazole-5,7-disulfonamide | 1/10 |

While the above examples have described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claims and does not extend to the substitution of any other groups for those which are specifically defined in the claims.

Having thus described my invention, I claim:

1. A 2,1,3-benzothiadiazole compound of the formula

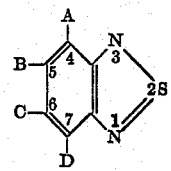

where A and D are selected from the group consisting of hydrogen, amino and sulfamyl; B is selected from the group consisting of hydrogen, sulfamyl and chlorine; and C is selected from the group consisting of hydrogen and chlorine, such compound having a minimum of one and a maximum of two of said sulfamyl groups, and alkali metal salts thereof.

2. 2,1,3-benzothiadiazole-4-sulfonamide.
3. 2,1,3-benzothiadiazole-5-sulfonamide.
4. 5,6-dichloro-2,1,3-benzothiadiazole-4-sulfonamide.
5. 6-chloro-2,1,3-benzothiadiazole-5-sulfonamide.
6. 4-amino-2,1,3-benzothiadiazole-5,7-disulfonamide.
7. In a method of making 2,1,3-benzothiadiazole-sulfonamide, the sulfamyl group being attached to the benzene ring, the steps which comprise treating 2,1,3-benzothiadiazole with chlorosulfonic acid, adding thionyl chloride, and treating the product with ammonia.
8. In a method of making dichloro-2,1,3-benzothiadiazolesulfonamide, the steps which comprise reacting dichloro-2,1,3-benzothiadiazole with chlorosulfonic acid and treating the resulting dichloro-2,1,3-benzothiadiazole-sulfonyl chloride with ammonia.
9. The method defined in claim 8 wherein the benzothiadiazole is 5,6-dichloro and the sulfonyl chloride and sulfonamide groups are in the 4-position.
10. In a method of making 5-chloro-2,1,3-benzothiadiazolesulfonamide, the steps which comprise reacting 5-chloro-2,1,3-benzothiadiazole with chlorosulfonic acid and treating the product with ammonia.

References Cited in the file of this patent

Martin et al.: Chem. Abstracts, vol 49, col. 1112b (1955).